US010573928B2

(12) United States Patent
Kim et al.

(10) Patent No.: US 10,573,928 B2
(45) Date of Patent: Feb. 25, 2020

(54) RECHARGEABLE BATTERY MODULE AND METHOD FOR MANUFACTURING THE SAME

(71) Applicant: UNIST(ULSAN NATIONAL INSTITUTE OF SCIENCE AND TECHNOLOGY), Ulsan (KR)

(72) Inventors: Young Sik Kim, Ulsan (KR); Wooseok Go, Ulsan (KR); Jin Hyup Han, Ulsan (KR)

(73) Assignee: UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 0 days.

(21) Appl. No.: 15/509,975

(22) PCT Filed: Jun. 7, 2016

(86) PCT No.: PCT/KR2016/005984
§ 371 (c)(1),
(2) Date: Mar. 9, 2017

(87) PCT Pub. No.: WO2017/209331
PCT Pub. Date: Dec. 7, 2017

(65) Prior Publication Data
US 2019/0088989 A1    Mar. 21, 2019

(30) Foreign Application Priority Data

Jun. 3, 2016  (KR) .................. 10-2016-0069586

(51) Int. Cl.
*H01M 4/66* (2006.01)
*H01M 10/0562* (2010.01)
(Continued)

(52) U.S. Cl.
CPC ..... *H01M 10/0562* (2013.01); *H01M 2/0222* (2013.01); *H01M 2/08* (2013.01);
(Continued)

(58) Field of Classification Search
None
See application file for complete search history.

(56) References Cited

U.S. PATENT DOCUMENTS

2011/0160641 A1  6/2011  Ueda
2014/0076730 A1  3/2014  Kim et al.
2017/0042198 A1* 2/2017  Choung ............ A23L 2/38

FOREIGN PATENT DOCUMENTS

JP       55-55971      4/1980
JP       2007-513464   5/2007
(Continued)

*Primary Examiner* — Tracy M Dove
(74) *Attorney, Agent, or Firm* — Lex IP Meister, PLLC

(57) ABSTRACT

A exemplary embodiment of the present invention provide a coin-type rechargeable battery module and a method for manufacturing the same in which a solid electrolyte selectively passing specific metal ions is applied to a negative electrode, an ion-containing solution (e.g., seawater) including sodium, lithium, magnesium, and a combination thereof is applied to a positive electrode, and the ion-containing solution flows in from the outside of the positive electrode, and which may be modularized to realize a large-capacity battery.

20 Claims, 13 Drawing Sheets

(51) Int. Cl.
*H01M 4/58* (2010.01)
*H01M 4/70* (2006.01)
*H01M 10/0585* (2010.01)
*H01M 2/02* (2006.01)
*H01M 2/08* (2006.01)
*H01M 2/10* (2006.01)
*H01M 2/20* (2006.01)
*H01M 2/04* (2006.01)
*H01M 10/052* (2010.01)

(52) U.S. Cl.
CPC ......... *H01M 2/1038* (2013.01); *H01M 2/204* (2013.01); *H01M 4/58* (2013.01); *H01M 4/66* (2013.01); *H01M 4/663* (2013.01); *H01M 4/70* (2013.01); *H01M 10/0585* (2013.01); *H01M 2/0404* (2013.01); *H01M 10/052* (2013.01)

(56) References Cited

FOREIGN PATENT DOCUMENTS

| | | |
|---|---|---|
| JP | 2009-187783 | 8/2009 |
| JP | 2009-224296 | 10/2009 |
| JP | 2010-225336 | 10/2010 |
| JP | 2011-228162 | 11/2011 |
| JP | 2012-155910 | 8/2012 |
| KR | 10-2006-0091449 | 8/2006 |
| KR | 10-2010-0000888 | 1/2010 |
| KR | 10-2011-0024259 | 3/2011 |
| KR | 10-2015-0091984 | 8/2015 |
| KR | 10-2016-0020085 | 2/2016 |
| WO | 2015-079689 | 6/2015 |
| WO | 2015-119414 | 8/2015 |
| WO | 2016-190659 | 12/2016 |

* cited by examiner

RECHARGEABLE BATTERY MODULE AND METHOD FOR MANUFACTURING THE SAME

TECHNICAL FIELD

The present invention relates to a rechargeable battery module and a method for manufacturing the same.

BACKGROUND ART

Generally, a rechargeable battery, a positive electrode and a negative electrode of which are made of materials that can electrochemically react, is a battery that may be charged or discharged through conversion between chemical energy and electrical energy. The rechargeable battery is mainly utilized in a vehicle, a ship, or the like that are required to store large amounts of electrical power.

As a representative example of the rechargeable batteries, there is a lithium rechargeable battery that generates electrical energy by chemical potential change when metal (e.g., lithium, sodium, or the like) ions are intercalated and deintercalated in a positive electrode and a negative electrode.

The lithium rechargeable battery is manufactured by utilizing materials that can reversibly intercalate and deintercalate the lithium ions as active materials for the positive electrode and the negative electrode, and by filling an organic electrolyte solution or a polymer electrolyte solution between the positive electrode and the negative electrode.

However, only a limited amount of lithium exists in the earth, and the lithium is generally obtained through difficult processes from minerals, salts, and the like. Since high cost and high energy are required for manufacturing the lithium rechargeable battery, a next generation rechargeable battery that may replace the lithium rechargeable battery is needed.

The lithium rechargeable battery may explode, and since a lithium metal oxide (e.g., $LiCoO_2$, $LiMn_2O_4$, etc.) used as a positive electrode active material is expensive, high cost is required for realizing a large storage system (an energy storage system (ESS)), and when a wasted lithium rechargeable battery is processed, environmental problems may occur. In addition, since facilities associated with lithium rechargeable batteries are mistaken for facilities such as nuclear power plants, when sites for them are selected, social issues such as opposition of residents may occur.

To solve these problems, it is essential to reduce the risk of explosion, to select a material that is environmentally friendly, is abundant in the earth, and is inexpensive, and to develop a battery system that may preemptively prevent conflicts with community members when a site therefor is selected, but study results for them are insufficient.

DISCLOSURE

Technical Problem

The present invention has been made in an effort to provide a coin-type rechargeable battery module and a method for manufacturing the same in which a solid electrolyte selectively passing specific metal ions is applied to a negative electrode, an ion-containing solution (e.g., seawater) including sodium, lithium, magnesium, and a combination thereof is applied to a positive electrode, and the ion-containing solution flows in from the outside of the positive electrode, and which may be modularized to realize a large-capacity battery.

Technical Solution

An exemplary embodiment of the present invention provides a rechargeable battery module including: a unit cell configured to include a negative electrode, a positive electrode, and a solid electrolyte positioned between the negative electrode and the positive electrode; and a battery pack in which one or more unit cells are mounted and that electrically connects the unit cells to each other, wherein the positive electrode of the unit cell may include an ion-containing solution containing sodium, lithium, magnesium, and a combination thereof and a positive electrode current collector impregnated with the ion-containing solution, and the ion-containing solution may flow into the positive electrode from the outside of the battery pack.

The battery pack may include: a supporting body in which one or more grooves in which the unit cells are respectively accommodated are arranged in a front surface thereof and in which the solid electrolyte contacts the groove; a negative electrode collector that is installed at the supporting body to be disposed at a bottom of the groove and contacts the negative electrode accommodated in the groove to be electrically connected, and a positive electrode collector that is disposed outside the supporting body to be electrically connected to the positive electrode.

The negative electrode collector may be integrally formed with the inside of the supporting body.

The positive electrode collector may have a lattice structure provided with a hole through which the ion-containing solution flows.

The battery pack may have a structure in which the grooves are formed in opposite surfaces of the supporting body with the negative electrode collector therebetween and the unit cells are arranged to be opposite to each other in opposite surfaces of the supporting body.

Each of the negative electrode collector and the positive electrode collector may include a terminal extending out of the supporting body.

An exemplary embodiment of the present invention provides a rechargeable battery module including:

a unit cell configured to include a negative electrode, a positive electrode, and a solid electrolyte positioned between the negative electrode and the positive electrode; a negative electrode lower case that forms the negative electrode and in which a negative electrode current collector is accommodated; a negative electrode upper case that is combined with the negative electrode lower case and in which a solid electrolyte is bonded to a front opening thereof; and a battery pack on which one or more coin batteries are mounted and that electrically connects the coin batteries to each other, wherein the positive electrode of the coin battery may include an ion-containing solution containing sodium, lithium, magnesium, and a combination thereof and a positive electrode current collector impregnated with the ion-containing solution, and the ion-containing solution may flow into the positive electrode from the outside of the battery pack.

The battery pack may include: a main body in which one or more holes in which the coin batteries are respectively accommodated are arranged in a front surface thereof; covers that are mounted on opposite surfaces of the main body to cover the coin batteries and in which slits through which the ion-containing solution flows are formed at positions corresponding to the positive electrodes of the coin batteries; a collector that is installed between each cover and the coin batteries to electrically connect the coin batteries; and a sealing portion that is installed at the main body to seal between the positive electrode and the negative electrode of the coin battery.

The sealing portion may include a sealing member installed between the hole and the coin battery, and an O-ring that is disposed along a circumference of the hole to seal the cover and the main body.

The sealing member is formed to have a tubular structure surrounding an outer circumferential surface of the coin battery, and is pressed between the cover and the main body to be in close contact between the hole and the coin battery.

The battery pack may be formed to have a structure in which the negative electrode and the positive electrode of the coin battery are alternately disposed, and the collector connects the negative electrodes and positive electrodes of adjacent coin batteries for the coin batteries to be connected in series.

The battery pack may be formed to have a structure in which the negative electrodes or positive electrodes of the coin batteries are disposed in the same direction, and the collector connects the negative electrodes and positive electrodes of adjacent coin batteries in series for the coin batteries to be connected in parallel.

The collector may be formed to have a ring shape, and a pressing bar that presses the positive electrode of the coin battery so that the collector closely contacts the solid electrolyte may be formed by extending from the collector to pass a center of the ring.

The collector may include a terminal extending out of the battery pack.

A stepped groove in which the collector is seated may be formed in a front surface of the cover toward the main body.

The main body may be provided with a stepped portion having a size corresponding to an outer diameter of the negative electrode upper case of the coin battery, the stepped portion may be formed inside the hole, and the negative electrode upper case of the coin battery may be caught and fixed to the stepped portion.

The unit cell or the coin battery may have a quadrangular cross-sectional structure.

The unit cell or the coin battery may have a hexagonal cross-sectional structure.

The rechargeable battery module may further include a housing in which a plurality of guides are arranged and formed so that a plurality of battery packs are inserted and accommodated, wherein the plurality of battery packs may be electrically connected.

A plurality of the housings may be connected to provide a large-capacity rechargeable battery module.

Another embodiment of the present invention provides a manufacturing method of a rechargeable battery module, including:

preparing a battery pack including a supporting body in which a plurality of grooves are provided and a negative electrode collector is integrally formed with the inside thereof;

positioning the negative electrodes on each groove of the supporting body, positioning a solid electrolyte on the negative electrode such that the solid electrolyte is bonded to the groove of the supporting body, and then positioning the positive electrode on the solid electrolyte such that a plurality of unit cells are mounted on the battery pack;

installing a positive electrode collector on the supporting body such that the positive electrodes of the unit cells mounted on respective grooves are electrically connected; and flowing an ion-containing solution containing sodium, lithium, magnesium, and a combination thereof into the positive electrode of the unit cell from the outside of the battery pack.

Another embodiment of the present invention provides a manufacturing method of a rechargeable battery module, including:

preparing a battery pack including a main body in which a plurality of holes are formed and a cover provided with a collector;

preparing a coin battery including a unit cell including a negative electrode, a positive electrode, and a solid electrolyte positioned between the negative electrode and the positive electrode, a negative electrode lower case that forms the negative electrode and in which a negative electrode current collector is accommodated, and a negative electrode upper case that is combined with the negative electrode lower case and in which the solid electrolyte is bonded to a front opening thereof;

mounting the coin battery on each hole of the main body with a sealing member therebetween;

installing an O-ring between the cover and the main body, and then installing the cover on the main body to electrically connect the collector and the coin battery; and flowing an ion-containing solution containing sodium, lithium, magnesium, and a combination thereof into the positive electrode of the coin battery from the outside of the battery pack.

The solid electrolyte may be one selected from a Na superionic conductor (NASICON), a Li superionic conductor (LISICON), an amorphous ion conductive material, a ceramic ion conductive material, and a combination thereof.

The negative electrode may further include a liquid electrolyte impregnated into a negative electrode current collector.

The liquid electrolyte may include a dissociable salt and an organic solvent.

The dissociable salt may be at least one selected from a sodium compound, a lithium compound, an ammonium compound, and a combination thereof.

The organic solvent may be at least one selected from an ether-based organic solvent, a carbonate-based organic solvent, a nitrile-based organic solvent, and a combination thereof.

In the positive electrode, the ion-containing solution may be one selected from seawater, saline, and a combination thereof.

Advantageous Effects

According to the exemplary embodiment of the present invention, the solid electrolyte selectively passing specific metal ions is applied to the negative electrode, and the ion-containing solution (e.g., seawater) including sodium, lithium, magnesium, and a combination thereof that are environmentally friendly and safe is applied to the positive electrode, thus a sea in which the representative seawater among the ion-containing solutions is abundant may be selected as a suitable site at which a large-scale storage system is positioned, thereby reducing the related costs and the environmental problems.

In addition, a large-capacity battery module may be realized by connecting a plurality of coin-type rechargeable batteries.

Further, it is possible to widen application fields and to vary purposes through a variety of layouts and serial and parallel connections.

It is also possible to reduce manufacturing costs by simplifying the structure thereof and minimizing the number of parts required when the large-capacity battery module is manufactured.

In addition, it is possible to reduce sealing problems and to facilitate assembly through a parts-integrated structure.

It is also possible to advantageously realize a large size by simplifying the structure thereof and reducing the volume thereof.

Further, it is possible to increase an energy storage area per unit area to manufacture a large-capacity battery module by improving the shape of the battery and minimizing empty space of the battery module.

MODE FOR INVENTION

Hereinafter, embodiments of the present invention will be described in detail. However, these embodiments are exemplary, the present invention is not limited thereto, and the scope of the present invention is defined by the claims.

First Exemplary Embodiment

Figure 1:
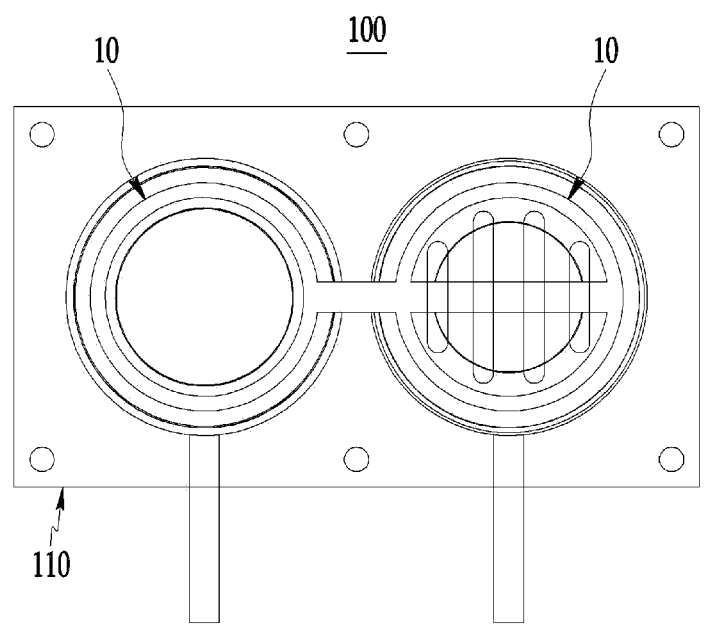
FIG. 1 to FIG. 3 illustrate schematic views of a rechargeable battery module according to an exemplary embodiment of the present invention.

FIG. 1 illustrates a rechargeable battery module according to a first exemplary embodiment of the present invention.

Figure 2:
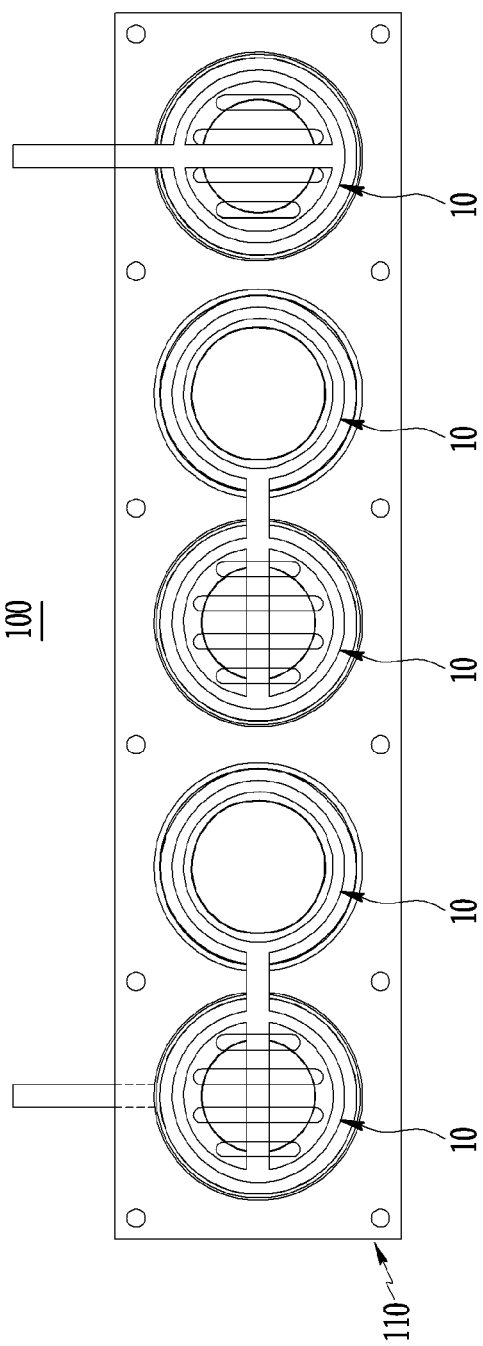
Figure 3:
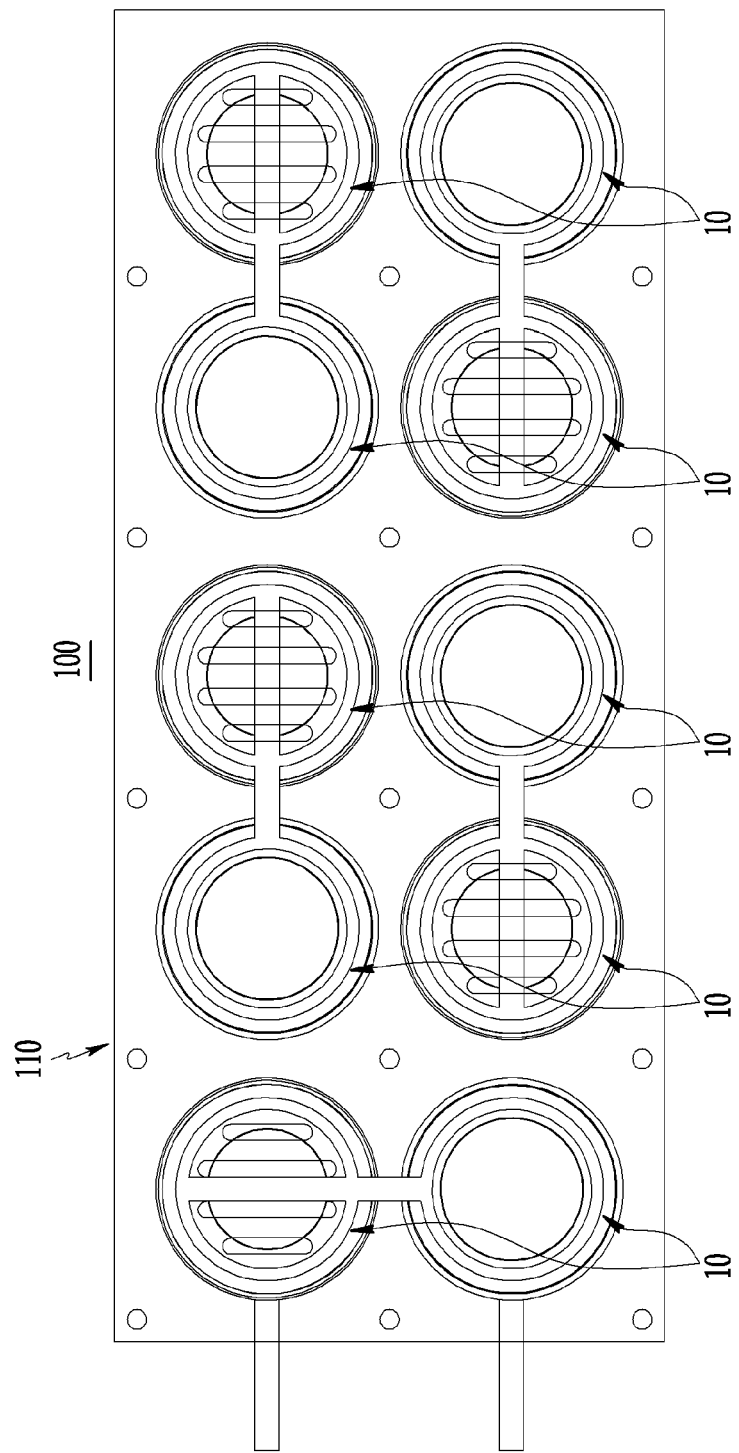

FIG. 1 to FIG. 3 respectively illustrate a rechargeable battery module 100 in which a plurality of coin batteries 10 are connected in series, and specifically, FIG. 1 illustrates a structure in which two coin batteries 10 are connected in series, FIG. 2 illustrates a structure in which five coin batteries 10 are connected in series, and FIG. 3 illustrates a structure in which ten coin batteries 10 are connected in series.

Since the rechargeable battery modules 100 in illustrated in FIG. 1 to FIG. 3 have the same configuration except for the number of coin batteries 10 and the number of parts according the number of coin batteries 10, the first exemplary embodiment will be described with reference to the rechargeable battery module 100 of FIG. 1 in which the two coin batteries 10 are connected in series.

Figure 4:
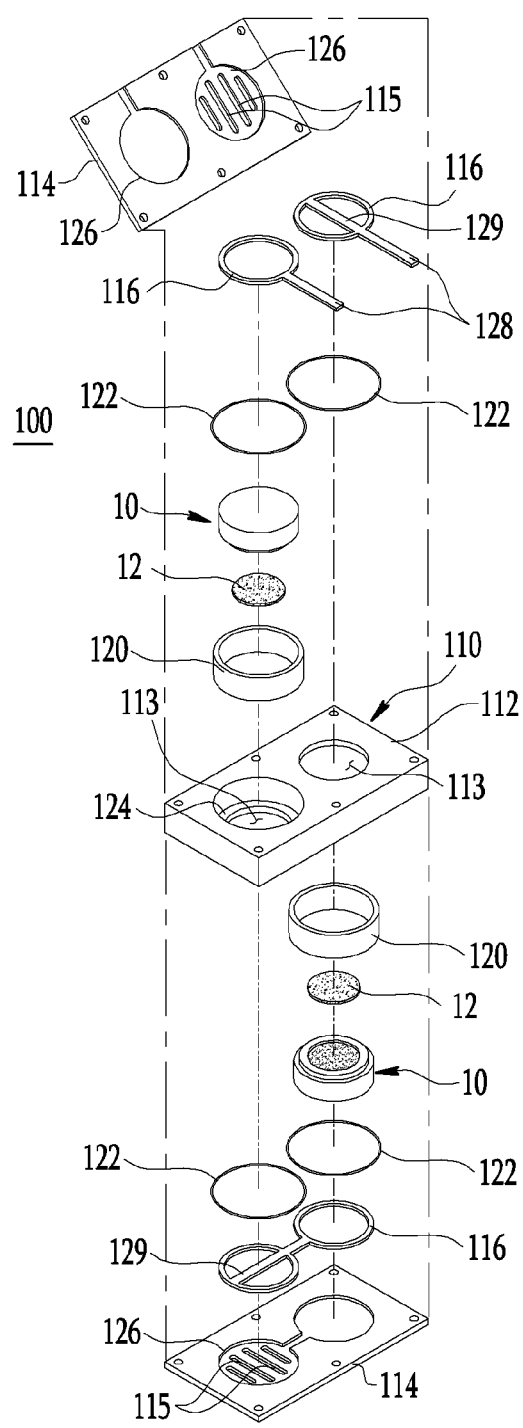
FIG. 4 illustrates an exploded perspective view of the rechargeable battery module according to the exemplary embodiment of FIG. 1.
Figure 5:
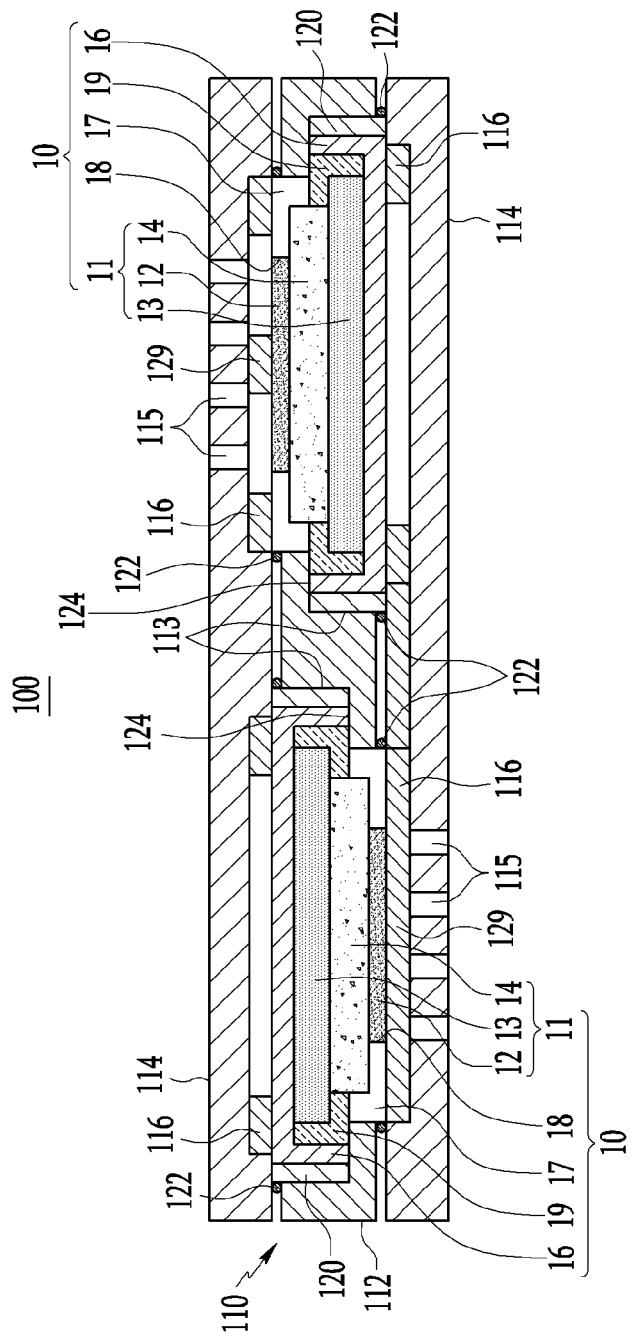
FIG. 5 illustrates a schematic cross-sectional view of the rechargeable battery module according to the exemplary embodiment of FIG. 1.

FIG. 4 illustrates a configuration of the rechargeable battery module according to the first exemplary embodiment, and FIG. 5 illustrates an assembled cross-sectional structure of the rechargeable battery module.

The rechargeable battery module 100 of the present exemplary embodiment includes the plurality of coin batteries 10, and a battery pack 110 that supports the plurality of coin batteries 10 and electrically connecting them to each other.

Thus, the plurality of coin batteries 10 in one battery pack 110 are connected in series to form a high power battery module.

Now, the coin battery 10 will be described.

In the present exemplary embodiment, the coin battery 10 has a structure in which an ion-containing solution flows into a positive electrode 12 from the outside. Therefore, the battery pack 110 including the plurality of coin batteries 10 has a structure that may allow the ion-containing solution to flow into the positive electrode 12 of the coin battery 10. The structure of the battery pack 110 will be described later in detail.

In the present exemplary embodiment, the coin battery 10 has a coin-shaped flat circular plate structure. An outer shape of the coin battery may be variously modified.

As shown in FIG. 5, the coin battery 10 may include a unit cell 11 including a negative electrode 13, the positive electrode 12, and a solid electrolyte 14 positioned between the negative electrode 13 and the positive electrode 12, a negative electrode lower case 16 that forms the negative electrode 13 and accommodates a negative electrode current collector therein, and a negative electrode upper case 17 that is combined with the negative electrode lower case 16 and to a front opening 18 to which the solid electrolyte 14 is bonded.

The coin battery 10 has a structure in which the unit cell 11 is assembled by the negative electrode lower case 16 and the negative electrode upper case 17. The negative electrode lower case 16 and the negative electrode upper case 17 form an outer shape of the coin battery.

In the coin battery 10, the negative electrode 13 is accommodated inside the negative electrode lower case 16 of which upper end portion is opened, and the negative electrode upper case 17 to which the solid electrolyte 14 is bonded is bonded to the opened front end of the negative electrode lower case 16. The solid electrolyte 14 is exposed through the opening 18 formed in the negative electrode upper case 17, and the positive electrode 12 is disposed on an outer surface of the exposed solid electrolyte 14 through the opening 18 of the negative electrode upper case 17. In addition, an insulating gasket 19 is provided between the negative electrode upper case 17 and the negative electrode lower case 16, and it insulates between the cases 17 and 16 and prevents a short circuit therebetween.

The solid electrolyte 14 selectively passes specific metal ions. The solid electrolyte 14 has a circular plate shape and is bonded to the inside of the opening 18 of the negative electrode upper case 17. The solid electrolyte 14 is sufficiently larger than a diameter of the opening 18 of the negative electrode upper case 17, and is bonded to the negative electrode upper case 17 to be exposed through the opening 18. The opening 18 of the negative electrode upper case 17, that is, a portion in which the solid electrolyte 14 is exposed, becomes a path through which the specific metal ions selectively pass while contacting the solid electrolyte 14.

The solid electrolyte 14 may be bonded to the negative electrode upper case 17 with an adhesive therebetween. The adhesive may include at least one selected from a silicon-based material, an epoxy-base material, and a combination thereof.

As long as the solid electrolyte 14 includes a material that selectively passes the specific metal ions (e.g., $Li^+$, $Na^+$, etc.), it is not particularly limited. Particularly, the material included in the solid electrolyte 14 may selectively pass the metal ions at a rapid speed, and form stable interfaces with an aqueous solution and an organic solution.

For example, the solid electrolyte 14 may be one selected from a Na superionic conductor (NASICON), a Li superionic conductor (LISICON), an amorphous ion conductive material, a ceramic ion conductive material, and a combination thereof.

Specifically, an example of the amorphous ion conductive material may be phosphorus-based glass, oxide-based glass, oxide/sulfide-based glass, etc.

In addition, an example of the ceramic ion conductive material may be lithium beta-alumina, sodium beta-alumina, etc.

More specifically, when the NASICON is selected as the solid electrolyte 14, ion conductivity of the solid electrolyte 14 may be further improved.

The negative electrode lower case 16 and the negative electrode upper case 17 may be respectively made of a metal material such as steel use stainless (SUS), aluminum (Al), steel, etc., or a non-ferrous metal material.

The negative electrode 13 includes the negative electrode current collector accommodated inside the negative electrode lower case 16.

The negative electrode current collector may be made of a non-ferrous metal material such as copper foil, nickel foil, stainless steel foil, titanium foil, nickel foam, copper foam, a polymeric substrate coated with a conductive metal, etc.

In the negative electrode 13, a negative electrode active material layer positioned on the negative electrode current collector may be further included, the negative electrode active material layer may include a negative electrode active material, and the negative electrode active material may include at least one selected from a metal, a metal oxide, a metal sulfide, a metal phosphide, a carbon-based material, and a combinations thereof.

The negative electrode 13 may further include a liquid electrolyte. The liquid electrolyte may include a dissociable salt and an organic solvent.

In this case, the organic solvent serves as a medium through which ions involved in an electrochemical reaction of the battery may move. For example, the organic solvent may be at least one selected from an ether-based organic solvent, a carbonate-based organic solvent, a nitrile-based organic solvent, and a combination thereof.

More specifically, an example of the ether-based organic solvent may be tri-ethylene glycol-di-methyl ether (TEGDME) and the like, an example of the carbonate-based organic solvent may be propylene carbonate (PC), ethyl-methylene carbonate (EMC), di-methylene carbonate (DMC), ethylene carbonate (EC), and the like, and an example of the nitrile-based organic solvent may be acetonitrile (ACN) and the like.

In addition, the dissociable salt dissolves in the organic solvent and functions as a source of positive ions in the battery to enable a basic operation of the rechargeable battery, and serves to promote movement of the positive ions between the positive electrode and the negative electrode. For example, the dissociable salt may be at least one selected from a sodium compound, a lithium compound, an ammonium compound, and a combination thereof.

More specifically, an example of the sodium compound may be $NaCF_3SO_3$, $NaPF_6$, $NaBF_4$, etc., an example of the lithium compound may be $LiPF_6$, $LiBF_4$, $LiClO_4$, etc., and an example of the ammonium compound may be $Et_4NBF_4$, $Et_4NPF_6$, etc.

The positive electrode 12 of the coin battery 10 includes an ion-containing solution containing sodium, lithium, magnesium, and a combination thereof and a positive electrode current collector impregnated with the ion-containing solution, and the ion-containing solution flows in from the outside of the coin battery 10.

In the positive electrode 12, the ion-containing solution containing sodium, lithium, magnesium, and a combination thereof may be one selected from seawater, saline, and a combination thereof.

Particularly, when the seawater is selected as the ion-containing solution, a manufacturing site of the coin-type rechargeable battery may be the sea, thus the seawater may flow into the positive electrode 12 out of the coin battery 10 through the opening 18 of the negative electrode upper case 17.

In the present exemplary embodiment, the positive electrode current collector is placed on the opening 18 of the negative electrode upper case 17 to contact the solid electrolyte 14 exposed through the opening 18.

The positive electrode current collector may include a carbon paper, a carbon fiber, a carbon cloth, a carbon felt, a metal film, or a combination thereof. The carbon paper may minimize byproducts that may occur from oxidation or reduction reactions of other metal ions contained in the sodium containing solution. In addition, when a catalytic electrode is disposed on the positive electrode current collector, reactivity may be further improved.

A plurality of coin batteries 10 having the structure described above are connected to each other by the battery pack 110 to form one rechargeable battery module 100.

Hereinafter, the battery pack 110 will be described.

The battery pack 110 may include a main body 112 in which one or more holes 113 in which the coin batteries 10 are respectively accommodated are arranged in a front surface thereof, covers 114 that are respectively mounted on opposite surfaces of the main body 112 to cover the coin battery 10 and wherein slits 115 through which an ion-containing solution supplied from the outside flows are formed at portions of the covers 114 corresponding to the positive electrode 12 of the coin battery 10, collectors 116 that are installed between respective covers 114 and the coin battery 10 to electrically connect the coin batteries 10, and a sealing portion that is installed at the main body 112 to seal between the positive electrode 12 of the coin battery 10 and the negative electrode 13.

The sealing portion includes a sealing member 120 installed between the hole 113 and the coin battery 10, and an O-ring 122 that is disposed along a circumference of the hole 113 to seal between the cover 114 and the main body 112.

The main body 112 and the cover 114 of the battery pack 110 seal and close the coin battery 10, and allow the ion-containing solution outside the coin battery to flow into the positive electrode 12 of the coin battery 10 through the slit 115 formed in the cover 114.

A size of the main body 112 and the number of holes 113 may vary according to the number of coin batteries 10 mounted on the main body 112.

For example, the main body 112 may be formed to have a quadrangular plate shape, and the holes 113 passing through a front surface of the main body 112 are arranged at predetermined intervals. The hole 113 is formed to correspond to the outer shape of the coin battery 10. A diameter of the hole 113 may be appropriately designed according to the size of the coin battery 10 and a thickness of the sealing member 120 installed between the hole 113 and the coin battery 10.

The rechargeable battery module 100 of the present exemplary embodiment has a structure in which the coin batteries 10 included in the battery pack 110 are connected in series. Thus, the coin batteries 10 that are adjacent in the battery pack 110 are installed in opposite directions, and the negative electrodes 13 and the positive electrodes 12 of the coin batteries 10 are alternately disposed along the holes 113 arranged at the battery pack 110.

The main body 112 is provided with a stepped portion 124 having a size corresponding to an outer diameter of the negative electrode upper case 17 of the coin battery 10, and the stepped portion 124 is formed inside the hole 113, and the negative electrode upper case 17 of the coin battery 10 is caught and fixed to the stepped portion 124. Outer shapes of the negative electrode upper case 17 and the negative electrode lower case 16 of the coin battery 10 are different. Thus, by forming the stepped portion 124 corresponding only to an outer diameter of the negative electrode upper case 17 inside the hole 113 of the main body 112, the coin battery 10 may be accurately inserted into the hole 113 of the main body 112 according to an insertion direction. Accordingly, as in the present exemplary embodiment, even if mounting directions of the coin batteries 10 are alternately changed for connecting the coin batteries 10 in series, the coin batteries 10 may be accurately mounted.

Thus, when the plurality of coin batteries 10 are mounted on the main body 112, it is possible to prevent erroneous insertion of each coin battery 10 and to insert the coin batteries 10 into the holes 113 in an accurate direction according to the serial connection of the coin batteries 10.

Two covers 114, which are plate-shaped structures, are respectively installed at opposite surfaces of the main body 112 to surround the coin battery 10 mounted on the main body 112 and to seal the battery pack 110. For example, the cover 114 may be fastened to the main body 112 with a bolt.

In the present exemplary embodiment, the slit 115 is formed in the cover 114 to correspond to the positive electrode 12 of the coin battery 10 such that the ion-containing solution may flow in the positive electrode 12.

Thus, in a state in which the coin battery 10 is sealed by the cover 114 and the main body 112, the ion-containing solution may be supplied to the positive electrode 12 of the coin battery 10 through the slit 115 formed in the cover 114.

As shown in FIG. 4, a stepped groove 126 in which the collector 116 is seated is formed in a front surface of the cover 114 toward the main body 112.

Thus, since the collector 116 is accurately placed in the stepped groove 126 of the cover 114 to be fitted and restricted to opposite end portions of the coin battery 10, it is possible to prevent electrical contact failure between them due to misplacement of the collector to the coin battery 10.

In the present exemplary embodiment, the main body 112 and the cover 114 may be made of materials such as plastic, acryl, polyether ether ketone (PEEK), Teflon, engineering plastic, propylene carbonate (PC), etc.

The collectors 116 electrically connect the negative electrodes 13 and the positive electrodes 12 of the adjacent coin batteries 10 in the main body 112 such that respective coin batteries 10 included in the main body 112 are connected in series. In the present exemplary embodiment, the negative electrode 13 of the coin battery 10 may be substantially understood as the negative electrode lower case 16 of the coin battery 10.

The collector 116 may be made of a conductive material, for example, a copper material. The collector 116 is pressed by the cover 114 while the cover 114 is mounted on the main body 112 to closely contact the negative electrode 13 and the positive electrode 12 of the coin battery 10.

The collector 116 is formed to have a plate shape folded onto the coin battery 10, and a portion of the collector 116 positioned at the positive electrode 12 of the coin battery 10 is formed to have a hollow ring shape to not prevent the ion-containing solution from flowing into the positive electrode 12. In the present exemplary embodiment, the collector 116 is positioned at the negative electrode 13 and the positive electrode 12 of the coin battery 10, and it may be formed to have a pair of ring shapes connected to each other. However, the collector 116 connected to the positive electrode 12 or the negative electrode 13 of an outermost one of the coin batteries connected in series in the battery pack 110 is formed to have a single ring shape, and it may include a terminal 128 extending out of the battery pack 110. Thus, the rechargeable battery module 100 may be electrically connected to the outside through two terminals 128 extending out of the battery pack 110.

In the present exemplary embodiment, a pressing bar 129 passing a center of the ring may be further provided at a portion of the collector 116 positioned at the positive electrode 12 of the coin battery 10 so that the positive electrode 12 may closely contact the solid electrolyte 14 by pressing the positive electrode 12 through the pressing bar 129. Since the pressing bar 129 is positioned on the positive electrode current collector of the positive electrode 12 placed on the solid electrolyte 14, it presses the positive electrode current collector to forcefully contact the solid electrolyte 14.

When the main body 112 and the cover 114 are assembled, the battery pack 110 is sealed, and an external ion-containing solution flows only into the positive electrode 12 of the coin battery 10 through the slit 115 of the battery pack 110.

The inside of the battery pack 110 is sealed by the sealing member 120 and the O-ring 122.

In the present exemplary embodiment, the sealing member 120 is formed to have a tubular structure surrounding an outer circumferential surface of the coin battery 10. The sealing member 120 may be made of a silicon material.

The sealing member 120 entirely surrounds an outer lateral surface of the coin battery, and it is pressed between the cover 114 and the main body 112 to be in close contact between the hole 113 and the coin battery 10.

The sealing member 120 is in close contact between an inner circumferential surface of the hole 113 and the coin battery 10 to block the ion-containing solution from moving through the hole 113. Thus, when the hole 113 is blocked by the sealing member 120, it is possible to prevent the ion-containing solution flowing into the positive electrode 12 of the coin battery 10 from moving to parts other than the positive electrode 12, for example, the negative electrode lower case 16 in which the negative electrode current collector is accommodated.

In addition, the sealing member 120 is in close contact between an inner circumferential surface of the hole 113 and the coin battery 10 so that the coin battery 10 is fixed and supported to the inside of the hole 113. Thus, the coin battery 10 may be stably mounted on the inside of the main body 112, and the sealing member 120 may absorb an external impact, thereby reducing the impact on the coin battery 10.

The O-ring 122 seals between the cover 114 and the main body 112 to prevent the ion-containing solution from flowing into the negative electrode 13 of the coin battery 10 mounted on the hole 113 of the main body 112.

The O-ring 122 forms a closed curved line, and is disposed along a circumference of the hole 113 into which the coin battery 10 is inserted. As shown in FIG. 4, in the present exemplary embodiment, the O-ring 122 may be provided at both the positive electrode 12 and the negative electrode 13 of the coin battery 10, and it may be provided only at the negative electrode 13 of the coin battery 10 to seal between the cover 114 and the main body 112.

Accordingly, the sealing with respect to the negative electrode 13 of the coin battery 10 is formed in the battery pack 110 through the sealing member 120 and the O-ring 122, thus the ion-containing solution supplied to the battery pack 110 flows only into the positive electrode 12 of the coin battery 10 to contact the positive electrode 12 of the coin battery 10.

As described above, according to the present exemplary embodiment, the high power rechargeable battery module 100 may be realized by disposing the coin batteries 10 in one battery pack 110 and connecting them in series.

Hereinafter, a manufacturing process of the rechargeable battery module according to the exemplary embodiment of the present invention will be described.

The rechargeable battery module 100 of the present exemplary embodiment may be manufactured through preparing the battery pack 110 including the main body 112 provided with the plurality of holes 113 and the covers 114 installed at opposite front end portions of the main body 112, respectively mounting the coin batteries 10 on the holes 113 of the main body 112 with the sealing member 120 therebetween after preparing the coin batteries 10, and assembling the covers 114 to the main body 112 with the O-ring 122 therebetween and then electrically connecting the coin batteries 10.

When the covers 114 are prepared, the collector 116 may be installed at the inside of each cover 114. Alternatively, while the cover 114 is assembled to the main body 112, the collector 116 may be installed between the cover 114 and the main body 112. A detailed order of assembling the collector 116 is not particularly limited.

As described above, the high power rechargeable battery module may be manufactured by the method of flowing the ion-containing solution into the positive electrode 12 of the coin battery 10 from the outside of the battery pack 110 after mounting the coin battery 10 on the battery pack 110 and assembling the battery pack 110. In the flowing of the ion-containing solution containing sodium, lithium, magnesium, and a combination thereof into the positive electrode 12 out of the battery pack 110, since the ion-containing solution flows into the positive electrode 12 of the coin battery 10 through the slit 115 of the battery pack 110, the battery pack 110 is immersed in the ion-containing solution after the cover 114 is assembled to the main body 112. Thus, there is no ion-containing solution at the outside of the assemble battery pack 110, and the ion-containing solution may flow into the positive electrode 12 of the coin battery 10 through the slit 115 from the outside of the battery pack 110. Since the coin battery 10 is sealed from the outside other than the positive electrode 12 in the battery pack 110, the ion-containing solution contacts only the positive electrode 12.

When the seawater is utilized as the ion-containing solution, it is possible to easily realize the high power rechargeable battery module 100 by supplying the seawater to the battery pack 110 or immersing the battery pack 110 in the seawater.

Second Exemplary Embodiment

Figure 6:
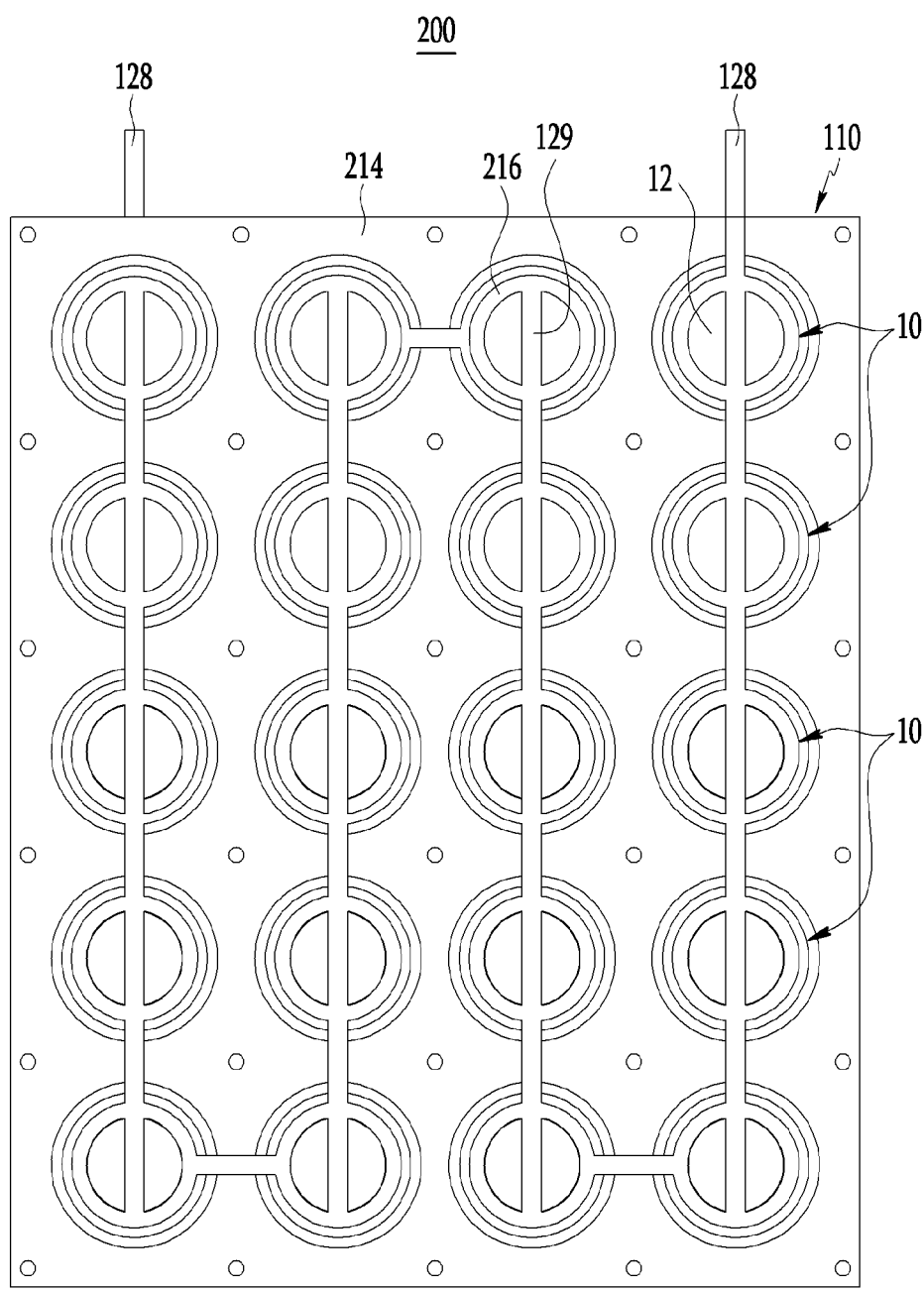
FIG. 6 illustrates a schematic view of a rechargeable battery module according to another exemplary embodiment of the present invention.
Figure 7:
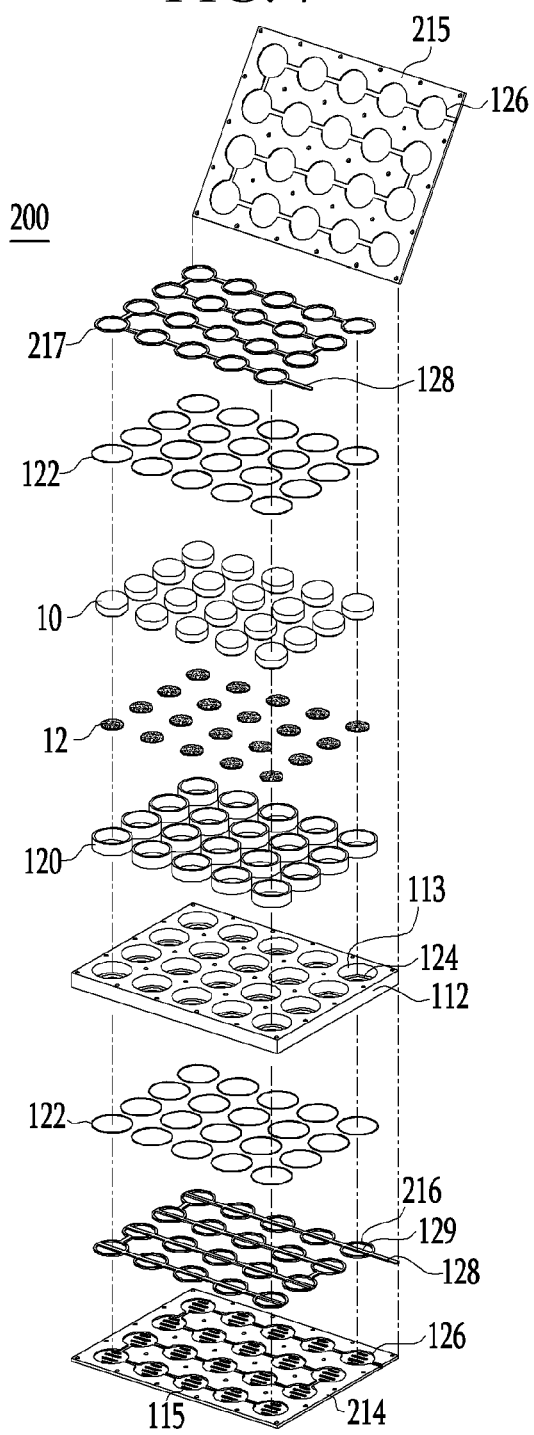
FIG. 7 illustrates an exploded perspective view of the rechargeable battery module according to the exemplary embodiment of FIG. 6.

FIG. 6 and FIG. 7 respectively illustrate a rechargeable battery module according to a second exemplary embodiment of the present invention, that is, a large-capacity rechargeable battery module in which a plurality of coin batteries are connected in parallel.

A structure of a rechargeable battery module 200 of the present exemplary embodiment is the same as that of the rechargeable battery module of the first exemplary embodiment described above except that the plurality of coin batteries 10 are connected in parallel. Thus, like reference numerals designate like or similar constituent elements, and a detailed description thereof will be omitted.

In the rechargeable battery module having a parallel connection structure, the number of the coin batteries 10 may be variously changed.

The rechargeable battery module 200 of the present exemplary embodiment includes the plurality of coin batteries 10 and the battery pack 110 that supports the plurality of coin batteries 10 and electrically connects them to each other. Thus, the plurality of coin batteries 10 included in one battery pack 110 are connected in parallel to form a large-capacity battery module.

In the battery pack 110, the negative electrodes 13 or the positive electrodes 12 of the coin batteries 10 are disposed in the same direction, the collectors disposed at opposite surfaces of the main body 112 are connected in series to each other, and the coin batteries 10 are connected in parallel.

All of the positive electrodes 12 or the negative electrodes 13 of the coin batteries 10 inserted into the holes 113 of the main body 112 are disposed in the same direction. FIG. 7 illustrates a structure in which the positive electrode 12 of each coin battery 10 is downwardly disposed in the drawing.

The stepped portions 124 formed in the holes 113 of the main body 112 are respectively formed at the same positions of the holes 113, and respective coin batteries 10 are respectively installed in the same direction in the holes 113.

In the present exemplary embodiment, since respective collectors disposed at the opposite surfaces of the main body 112 are folded only with respect to the negative electrode 13 of the coin battery 10 or only with respect to the positive electrode 12 of the coin battery 10, their shapes may be slightly different from each other. Hereinafter, for better understanding and ease of description, among the collectors of the present exemplary embodiment, the collector for connecting the positive electrodes 12 of the coin batteries 10 is referred to as a positive electrode collector 216, and the collector for connecting the negative electrodes 13 of the coin batteries 10 is referred to as a negative electrode collector 217. The collector may be referred to as both the positive electrode collector and the negative electrode collector. In addition, among the covers, the cover at which the positive electrode collector 216 is installed is referred to as a positive electrode cover 214, and the cover at which the negative electrode collector 217 is installed is referred to as a negative electrode cover 215.

The negative electrode collectors 217 are disposed to correspond to the coin batteries 10 at one surface of the main body 112, are connected in series to each other, and have ring shapes contacting the negative electrodes 13 of the coin batteries 10. The terminal 128 extending out of the battery pack 110 may be further provided at an end of one side of the negative electrode collectors 217 connected in series.

In the negative electrode cover 215 at which the negative electrode collector 217 is installed, the stepped groove 126 is formed to have a shape corresponding to the negative electrode collector in an inner surface of the negative electrode collector toward the main body 112.

The positive electrode collectors 216 are disposed to correspond to the coin batteries 10 at the other surface of the main body 112, are connected in series to each other, and have ring shapes contacting the positive electrodes 12 of the coin batteries 10. The terminal 128 extending out of the battery pack 110 may be further provided at an end of one side of the positive electrode collectors 216 connected in series. As shown in FIG. 7, the positive electrode collector 216 is further provided with the pressing bar 129 for pressing the positive electrode 12 to closely contact the solid electrolyte 14, and the pressing bar 129 passes a center of the ring.

In the positive electrode cover 214 at which the positive electrode collector 216 is installed, the stepped groove 126 is formed to have a shape corresponding to the positive electrode collector in an inner surface the positive electrode cover 214 toward the main body 112.

As described above, the rechargeable battery module 200 of the present exemplary embodiment may become a large-capacity rechargeable battery module by disposing the coin batteries 10 in one battery pack 110 and connecting them in parallel.

Third Exemplary Embodiment

Figure 8:
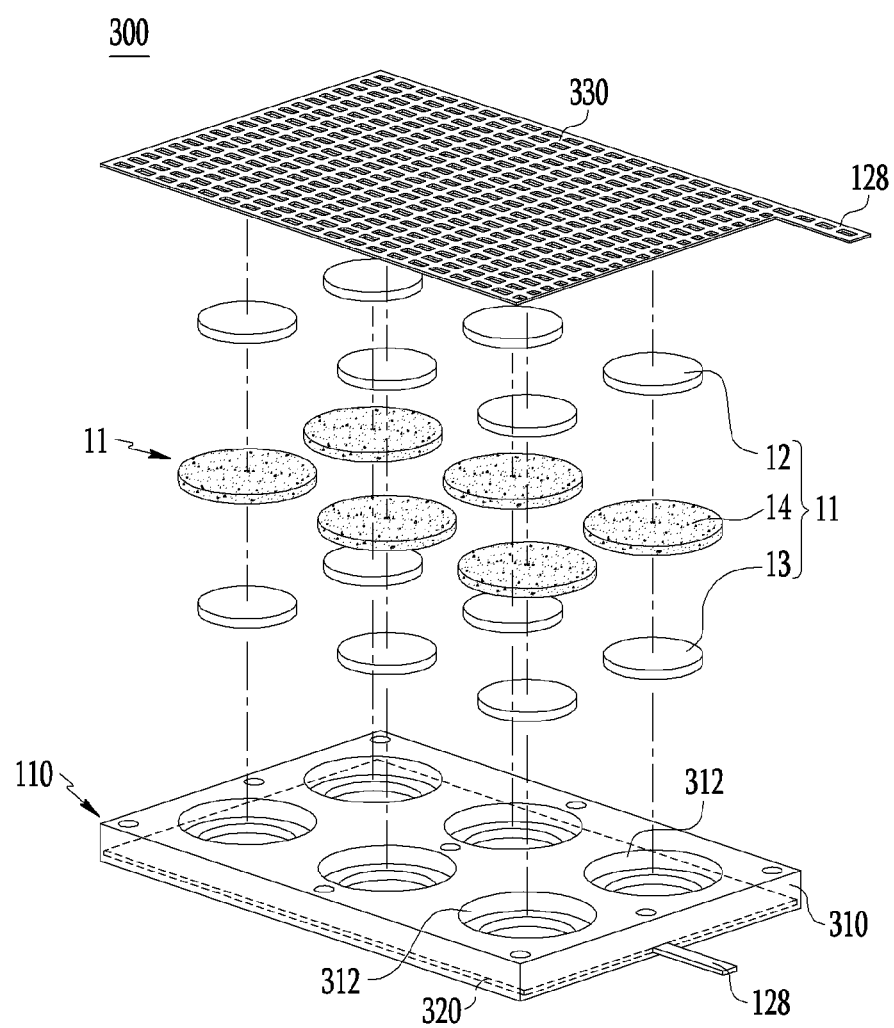
FIG. 8 illustrates an exploded perspective view of a rechargeable battery module according to another exemplary embodiment of the present invention.
Figure 9:
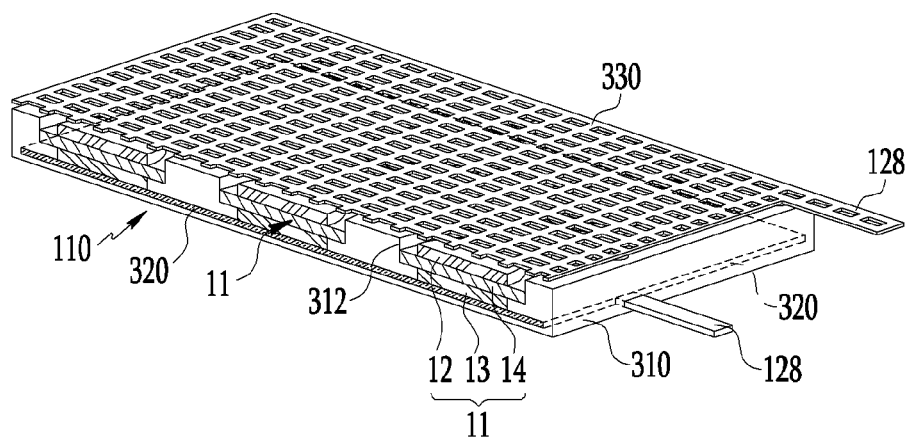
FIG. 9 illustrates a schematic cross-sectional view of part of the rechargeable battery module according to the exemplary embodiment of FIG. 8.

FIG. 8 and FIG. 9 respectively illustrate a rechargeable battery module according to a third exemplary embodiment of the present invention.

As shown in FIG. 8 and FIG. 9, a rechargeable battery module 300 of the present exemplary embodiment includes a plurality of unit cells 11 and the battery pack 110 that supports the plurality of unit cells 11 and electrically connects them.

Thus, the plurality of unit cells 11 are connected in parallel in one battery pack 110 to form a large-capacity rechargeable battery module 300.

As described above, the unit cell 11, as a minimum unit of a rechargeable battery, includes the negative electrode 13, the positive electrode 12, and the solid electrolyte 14 positioned between the negative electrode 13 and the positive electrode 12.

The unit cell 11 and the battery pack 110 are assembled to substantially form the rechargeable battery, and according to the present exemplary embodiment, the plurality of unit cells 11 are mounted on the battery pack 110 to form the large-capacity rechargeable battery module 300.

Since respective configurations of the unit cell 11 are described above, like reference numerals designate like or similar constituent elements, and a detailed description thereof will be omitted.

The plurality of unit cells 11 are connected in parallel to each other by the battery pack 110 to form one battery module.

The battery pack 110 of the rechargeable battery module 300 may include: a supporting body 310 in which one or more grooves 312 in which the unit cells are respectively accommodated are arranged in a front surface thereof and in which the solid electrolyte 14 is bonded to the groove 312; a negative electrode collector 320 that is installed at the supporting body 310 and contacts the negative electrodes 13 that are disposed on bottoms of respective grooves 312, are electrically connected to each other, and are accommodated in the grooves 312; and a positive electrode collector 330 that is disposed at the outside of the supporting body 310 and is electrically connected to the positive electrode 12.

A size of the supporting body 310 and the number of grooves 312 may vary according to the number of unit cells 11.

For example, the supporting body 310 may be formed to have a quadrangular plate shape, and the grooves 312 are arranged at predetermined intervals in one surface of the supporting body 310. The groove 312 may be formed to have a shape and a size corresponding to the unit cell 11. The supporting body 310 may be made of materials such as plastic, acryl, polyether ether ketone (PEEK), Teflon, engineering plastic, propylene carbonate (PC), etc.

The groove 312 formed in the supporting body 310 may be stepped so that the negative electrode 13, the solid electrolyte 14, and the positive electrode 12 are sequentially stacked. The negative electrode collector 320 installed at the supporting body 310 is positioned at the bottom of the groove 312. That is, the negative electrode collector 320 forms a bottom surface of the groove 312 inside the supporting body 310. In the unit cell 11, the negative electrode 13, the solid electrolyte 14, and the positive electrode 12 are sequentially stacked on the negative electrode collector 320 forming the bottom surface of the groove 312.

In the battery pack 110 of the present exemplary embodiment, the negative electrode collector 320 is integrally formed with the inside of the supporting body 310. Herein, the meaning of being integrally formed is that the supporting body 310 and the negative electrode collector 320 that are made of different materials are tightly bonded together to form a body.

By the negative electrode collector 320 being integrally formed with the inside of the supporting body 310, the negative electrode collector 320 is surrounded by the supporting body 310, thus it does not substantially contact the ion-containing solution. Accordingly, it is possible to improve the sealing between the supporting body 310 and the negative electrode collector 320 and the assembly thereof and to minimize the volume of the rechargeable battery module.

In the present exemplary embodiment, as shown in FIG. 9, the negative electrode collector 320 is inserted into the inside of the supporting body 310 to be integrated with the supporting body 310. The negative electrode collector 320 has a plate shape having a size corresponding to a front surface of the supporting body 310, and it is integrally bonded to the supporting body 310 to form a bottom surface of each hole 113. The negative electrode collector 320 is entirely formed with one plate member to electrically connect the negative electrodes 13 of the unit cells 11 respectively mounted on respective grooves 312 in parallel.

Except for the structure described above, the negative electrode collector is entirely formed as one body, it is formed to have a shape corresponding to each groove 312, and it is not formed between the grooves. According to this structure, it is possible to reduce a material of the negative electrode collector material, thus reducing the manufacturing cost of the battery module.

The negative electrode collector 320 is electrically connected to the negative electrode 13 of the unit cell 11 mounted on the groove 312 to connect the unit cells 11 accommodated in the supporting body 310 in parallel. The negative electrode collector 320 may be made of a conductive material, for example, a copper material.

In a state in which the negative electrode collector 320 is disposed at the bottom of the groove 312 of the supporting body 310, the negative electrode 13 is positioned on the negative electrode collector 320, and the solid electrolyte 14 is positioned on the negative electrode 13 to be bonded to the supporting body 310. The solid electrolyte 14 may be bonded to the supporting body 310 with an adhesive therebetween.

By the supporting body 310 and the solid electrolyte 14 being bonded to each other, the negative electrode 13 accommodated between the solid electrolyte 14 and the negative electrode collector 320 is blocked from the outside and is sealed in the groove 312 of the supporting body 310. Thus, it is possible to block the ion-containing solution supplied to the battery pack 110 from flowing into the negative electrode 13. Since the negative electrode collector 320 is entirely surrounded by the supporting body 310, the negative electrode collector 320 does not contact the ion-containing solution.

The positive electrode 12 is disposed at the outside of the solid electrolyte 14, and the positive electrode collector 330 for electrically connecting the positive electrode 12 is installed at the outside of the solid electrolyte 14.

In the present exemplary embodiment, the positive electrode collector 330 may be formed to have a size substantially corresponding to the front surface of the supporting body 310 the battery pack 110 to be connected to all of the positive electrodes 12 of the unit cells 11. Since the positive electrode collector 330 is disposed at the outside of the positive electrode 12, it may be formed to have a lattice structure provided with holes through which the ion-containing solution flows so that the ion-containing solution supplied to the battery pack 110 easily flows into the positive electrode 12.

In addition, the terminal 128 extending out of the battery pack 110 may be further provided at each of the negative electrode collector 320 and the positive electrode collector 330. The terminal provided at the negative electrode collector 320 passes through the supporting body 310 to extend to the outside. Thus, the rechargeable battery module 300 is electrically connected to the outside easily by two terminals 128 extending out of the battery pack 110.

As such, since the plurality of unit cells 11 are assembled to form the rechargeable battery module 300 while sharing one supporting body 310, it is possible to minimize constituent parts and volume of the module and to realize the large-capacity battery module. Further, an additional sealing structure for the negative electrode collector 320 and the negative electrode 13 is unnecessary, and it is possible to achieve an excellent sealing effect.

Hereinafter, a manufacturing process of the rechargeable battery module according to the exemplary embodiment of the present invention will be described.

The rechargeable battery module 300 of the present exemplary embodiment may be manufactured through preparing the battery pack 110 including the supporting body 310 in which the plurality of grooves 312 are provided and the negative electrode collector 320 is integrally formed with the inside thereof, respectively mounting the unit cells 11 on the grooves 312 of the supporting body 310 after preparing the unit cells 11, and installing the positive electrode collector 330 on the supporting body 310 and then electrically connecting the positive electrodes 12 of the unit cells 11 respectively mounted on the grooves 312.

In the mounting of the unit cells 11, the negative electrode 13 is inserted into the inside of each groove 312 of the supporting body 310. Then, the solid electrolyte 14 is positioned on the negative electrode 13, and the solid electrolyte 14 is bonded to the groove 312 of the supporting body 310.

Since the stepped portion 124 corresponding to the solid electrolyte 14 is provided so that the solid electrolyte 14 may be placed on the inner circumferential surface of the groove 312 of the supporting body 310, the solid electrolyte 14 may be bonded to the stepped portion 124 with an adhesive therebetween.

When the solid electrolyte 14 is bonded to the groove 312 of the supporting body 310, the unit cells 11 may be respectively mounted on the grooves 312 of the supporting body 310 by positioning the positive electrode 12 on the solid electrolyte 14.

Then, as described above, after the unit cells 11 are mounted on the supporting body 310 and the battery pack 110 is assembled, by flowing the ion-containing solution into the positive electrodes 12 of the unit cells 11 out of the battery pack 110, the high power rechargeable battery module may be manufactured.

In the flowing of the ion-containing solution containing sodium, lithium, magnesium, and a combination thereof to the positive electrode 12 out of the battery pack 110, since the ion-containing solution flows into the positive electrode 12 of the unit cell 11 through the positive electrode collector 330 of the battery pack 110, after the battery pack is assembled, the battery pack 110 may be immersed in the ion-containing solution. Therefore, the ion-containing solution exists at the outside of the assembly of the battery pack 110, thus the ion-containing solution may flow into the positive electrodes 12 of the unit cells 11 mounted on the supporting body 310 through the positive electrode collector 330 of a lattice shape from outside of the battery pack 110. In the battery pack 110, the negative electrode 13 and the negative electrode collector 320 of the unit cell 11 are positioned inside the supporting body 310 to be sealed from the outside, thus the ion-containing solution contacts only the positive electrode 12.

When the seawater is utilized as the ion-containing solution, it is possible to easily realize the large-capacity rechargeable battery module by supplying the seawater to the battery pack 110 or immersing the battery pack 110 in the seawater.

Fourth Exemplary Embodiment

Figure 10:
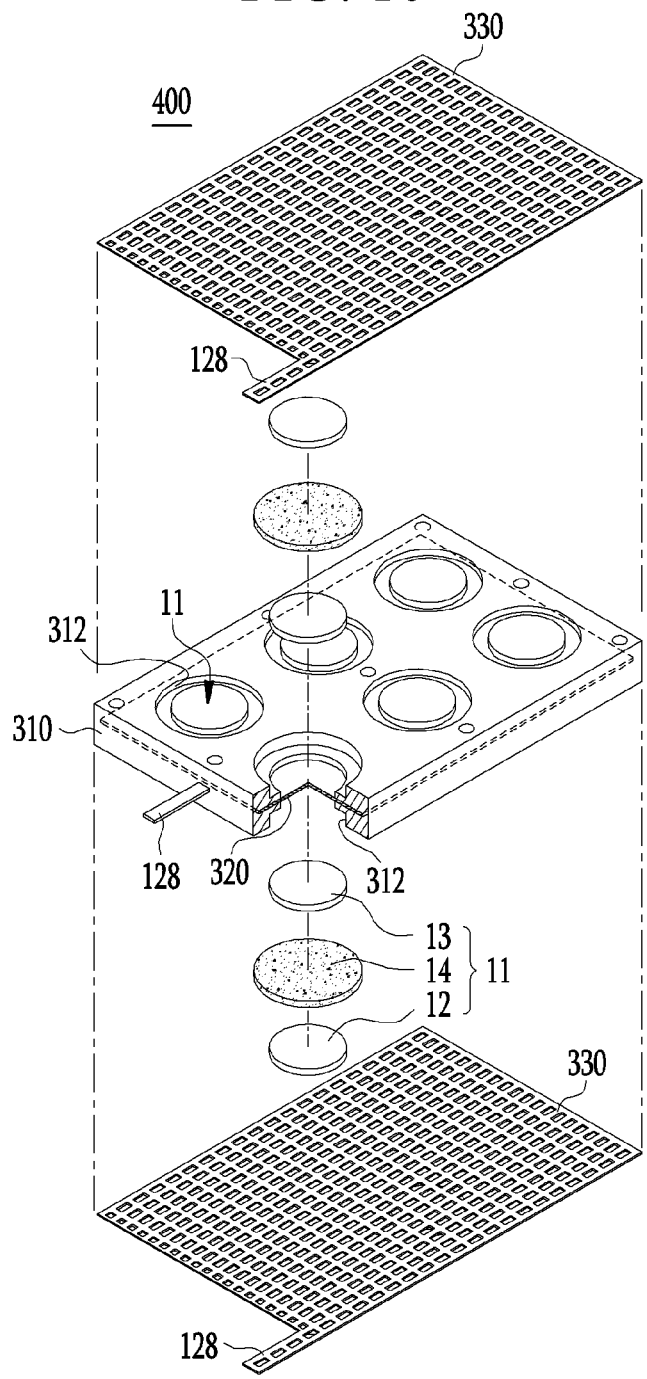
FIG. 10 illustrates an exploded perspective view of a rechargeable battery module according to another exemplary embodiment of the present invention.

FIG. 10 illustrates a large-capacity rechargeable battery module according to a fourth exemplary embodiment of the present invention, in which the unit cells 11 are mounted on opposite surfaces of the battery pack 110.

A structure of a rechargeable battery module 400 of the present exemplary embodiment is the same as that of the rechargeable battery module of the third exemplary embodiment described above except that the plurality of unit cells 11 are mounted on the opposite surfaces of the battery pack 110. Thus, like reference numerals designate like or similar constituent elements, and a detailed description thereof will be omitted.

In the rechargeable battery module 400 having the structure in which the plurality of unit cells 11 are mounted on the opposite surfaces of the battery pack 110, the number of unit cells 11 may be variously changed.

The rechargeable battery module 400 of the present exemplary embodiment includes the plurality of unit cells 11 and the battery pack 110 that supports the plurality of unit cells 11 and electrically connects them to each other. Thus, the plurality of unit cells 11 are connected in parallel in one battery pack 110 to form the large-capacity rechargeable battery module.

The battery pack 110 may include: the supporting body 310 in which one or more grooves 312 respectively accommodating the unit cells 11 are formed at opposite surfaces thereof; the negative electrode collector 320 that is installed inside the supporting body 310, forms a bottom surface of each groove 312, and contacts the negative electrodes 13 that are electrically connected to each other and are respectively accommodated in the grooves 312; and the positive electrode collector 330 that is disposed outside the supporting body 310 to be electrically connected to the positive electrode 12.

A size of the supporting body 310 and the number of grooves 312 may vary according to the number of unit cells 11.

In addition, the positions of the grooves 312 formed in the opposite surfaces of the supporting body 310 may be the same or different from each other.

In the battery pack 110 of the present exemplary embodiment, the grooves 312 are formed in the opposite surfaces of the supporting body 310 with the negative electrode collector 320 integrally formed with the inside of the supporting body 310 therebetween, and the unit cells 11 are mounted to be opposite to each other on the opposite surfaces of the supporting body 310. In the unit cells 11 in the opposite surfaces of the supporting body 310, the negative electrode 13, the solid electrolyte 14, and the positive electrode 12 are sequentially stacked on the negative electrode collector 320 forming the bottom surface of the groove 312.

The positive electrode collectors 330 are respectively disposed at the opposite surfaces of the supporting body 310 to electrically connect the positive electrodes 12 of the unit cells 11 disposed at the opposite surfaces of the supporting body 310.

The negative electrode collector 320 integrally formed with the inside of the supporting body 310 forms the bottom surfaces of the grooves 312 formed in the opposite surfaces of the supporting body 310. That is, in the present exemplary embodiment, the unit cells 11 mounted on the opposite surfaces of the supporting body 310 share one negative electrode collector 320 provided inside the supporting body 310. Thus, the negative electrode collector 320 serves as a common negative electrode collector 320 of the unit cells 11 disposed to be opposite to each other at the opposite surfaces of the supporting body 310.

As such, by the unit cells 11 disposed at the opposite surfaces of the supporting body 310 sharing the one negative electrode collector 320, it is possible to minimize the volume of the battery pack 110 and to realize the large-capacity battery module 400.

Fifth Exemplary Embodiment

Figure 11:
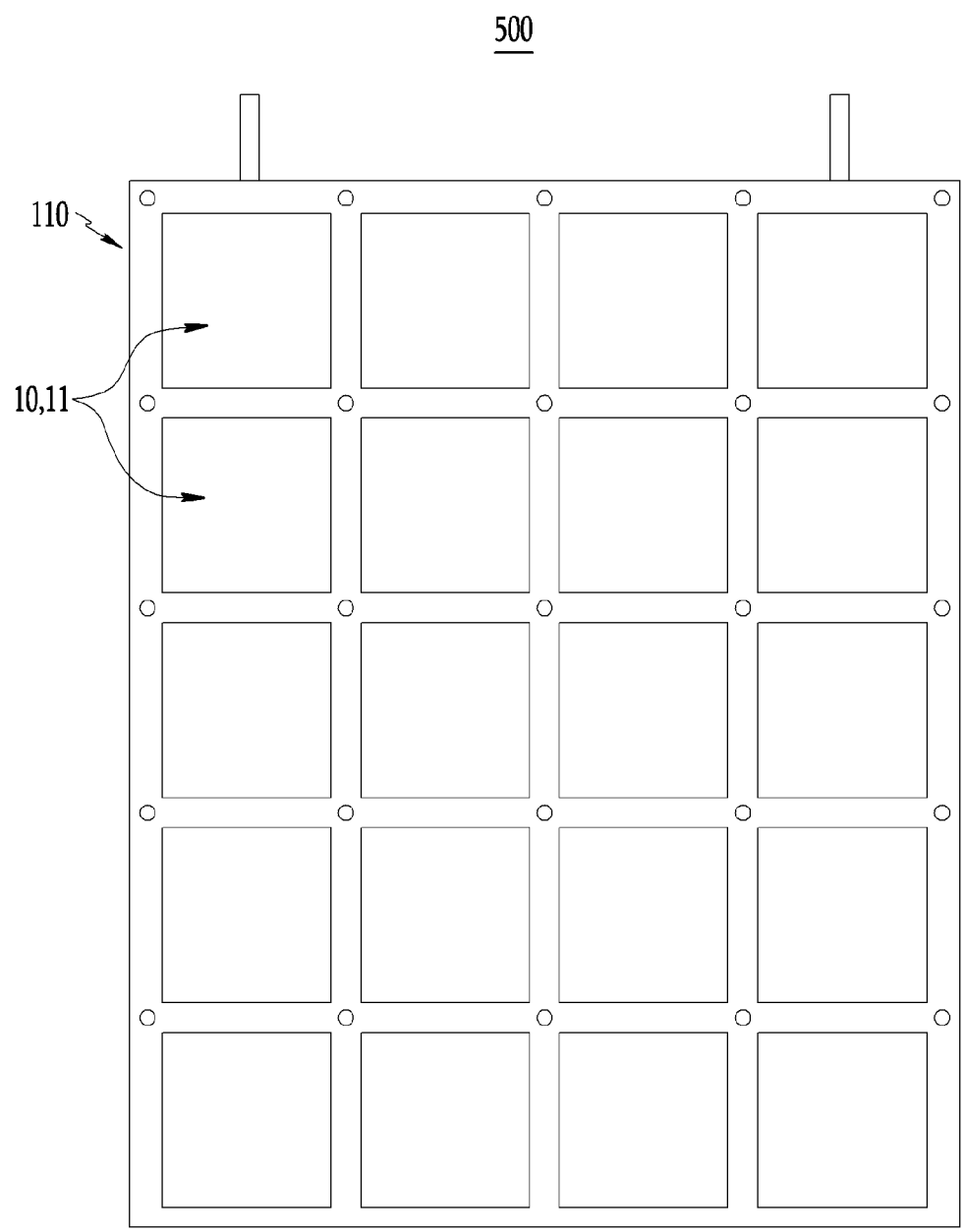
FIG. 11 and FIG. 12 illustrate schematic views of a rechargeable battery module according to a structure of a unit cell.
Figure 12:
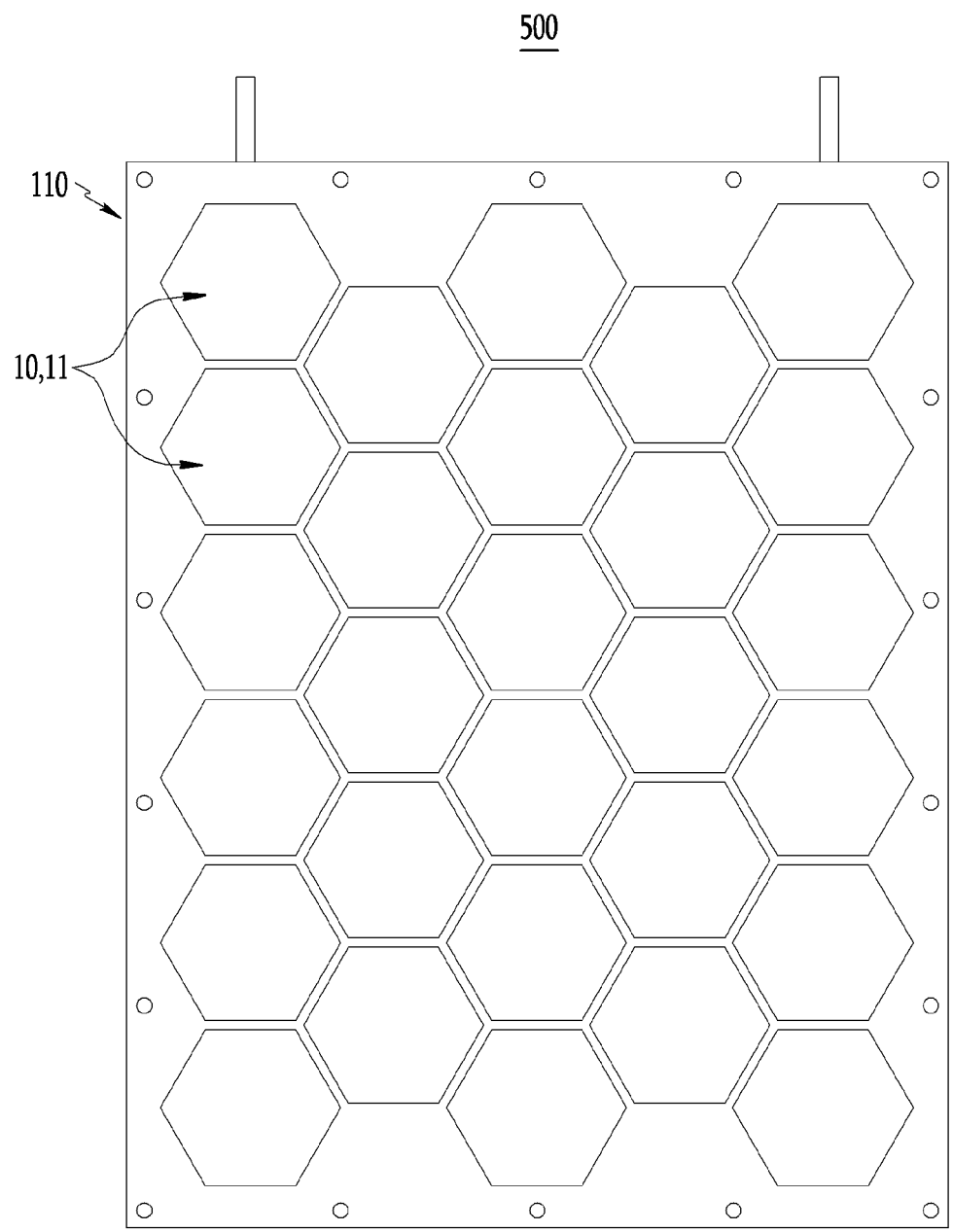

FIG. 11 and FIG. 12 respectively illustrate a rechargeable battery module according to a fifth exemplary embodiment of the present invention.

As shown in FIG. 11, in a rechargeable battery module 500 of the present exemplary embodiment, the plurality of unit cells 11 or coin batteries 10 provided in the battery pack 110 may have a quadrangular cross-sectional structure.

Thus, the unit cells 11 or the coin batteries 10 in the battery pack 110 are arranged in a lattice shape so that their lateral surfaces face each other in rows, and accordingly, it is possible to minimize a space between the unit cells 11 or the coin batteries 10. That is, it is possible to minimize unnecessary spaces other than the batteries in the battery pack 110, and more unit cells 11 or coin batteries may be mounted. Accordingly, the capacity of the battery module compared to the area thereof can be further increased.

FIG. 12 illustrates the rechargeable battery module 500 in which the plurality of unit cells 11 or coin batteries 10 provided in the battery pack 110 have hexagonal cross-sectional structures.

As the unit cells 11 or coin batteries 10 respectively have the hexagonal shapes, they are disposed in rows so that the lateral surfaces of the adjacent unit cells 11 or coin batteries 10 face each other in the battery pack 110, thus a space between the adjacent unit cells 11 or coin batteries 10 may be minimized.

Accordingly, the rechargeable battery module 500 according to the exemplary embodiment of FIG. 12 may minimize unnecessary spaces other than the batteries in the battery pack 110 to maximize the capacity of the battery module compared to the area thereof.

Sixth Exemplary Embodiment

Figure 13:
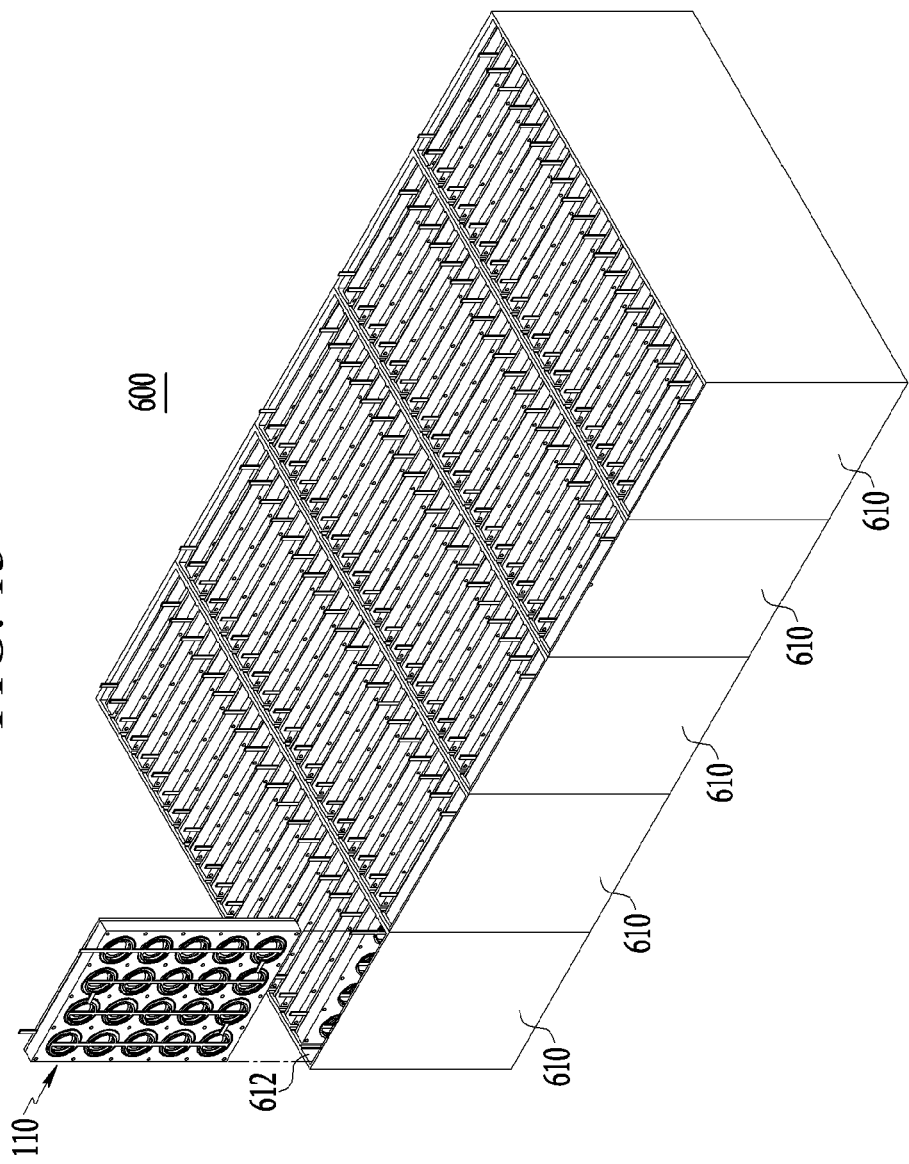
FIG. 13 illustrates a schematic view of a large-capacity rechargeable battery module.

FIG. 13 illustrates a large-capacity rechargeable battery module according to a sixth exemplary embodiment of the present invention.

A rechargeable battery module 600 of the present exemplary embodiment includes a housing 610 provided with a plurality of guides 612 into which a plurality of the battery packs 110 on which a plurality of unit cells or coin batteries are mounted are inserted and accommodated, and the plurality of the battery packs 110 are electrically connected.

A size and a shape of the housing 610 may be variously changed, and are not particularly limited.

For example, the housing 610 may have a box structure of a quadrangular shape. The guides 612 may be continually formed along a length direction in the housing, so that the battery packs 110 may be sequentially inserted. A high power and large-capacity rechargeable battery module may be realized by connecting terminals respectively provided at the plurality of the battery packs 110 inserted into the housing 610 in series or parallel.

In addition, according to the present exemplary embodiment, a greater large-capacity rechargeable battery module may be realized by connecting a plurality of the housings 610.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

DESCRIPTION OF SYMBOLS

| | |
|---|---|
| 10: coin battery | 11: unit cell |
| 12: positive electrode | 13: negative electrode |
| 14: solid electrolyte | 16: negative electrode lower case |
| 17: negative electrode upper case | |
| 18: opening | 19: gasket |
| 100, 200, 300, 400, 500, 600: rechargeable battery module | |
| 110: battery pack | 112: main body |
| 113: hole | 114: cover |

| | |
|---|---|
| 115: slit | 116: collector |
| 120: sealing member | 122: O-ring |
| 124: stepped portion | 126: stepped groove |
| 128: terminal | 129: pressing bar |
| 214: positive electrode cover | 215: negative electrode cover |
| 216: positive electrode collector | |
| 217: negative electrode collector | |
| 310: supporting body | 312: groove |
| 320: negative electrode collector | |
| 330: positive electrode collector | |
| 610: housing | 612: guide |

The invention claimed is:

1. A rechargeable battery module comprising:
a plurality of unit cells, wherein each of the plurality of unit cells includes a negative electrode, a positive electrode, and a solid electrolyte positioned between the negative electrode and the positive electrode; and
a battery pack in which the plurality of unit cells are mounted and that electrically connects the plurality of unit cells to each other,
wherein the positive electrode of each of the plurality of unit cells includes an ion-containing solution containing at least one selected from a group consisting of sodium, lithium, magnesium, and a combination thereof and a positive electrode current collector impregnated with the ion-containing solution, and the ion-containing solution flows into the positive electrode of each of the plurality of unit cells from an outside of the battery pack, and
wherein
the battery pack includes: a supporting body in which a plurality of grooves in each of which each of the plurality of unit cells is accommodated are arranged in a front surface of the supporting body and in each of which the solid electrolyte of each of the plurality of unit cells interposed between the negative electrode and the positive electrode of each of the plurality of unit cells; a negative electrode collector that is installed at the supporting body to be disposed at a bottom of the plurality of grooves and contacts the negative electrode of each of the plurality of unit cells accommodated in each of the plurality of grooves to be electrically connected to the negative electrode of each of the plurality of unit cells, and a positive electrode collector that is disposed outside the supporting body to be electrically connected to the positive electrode of each of the plurality of unit cells.

2. The rechargeable battery module of claim 1, wherein the battery pack has a structure in which the plurality of grooves are formed in opposite surfaces of the supporting body with the negative electrode collector therebetween and each of the plurality of unit cells is inserted in each of the plurality of grooves.

3. The rechargeable battery module of claim 1, wherein the negative electrode collector is integrally formed.

4. The rechargeable battery module of claim 3, wherein the positive electrode collector has a lattice structure provided with a hole through which the ion-containing solution flows.

5. The rechargeable battery module of claim 4, wherein each of the negative electrode collector and the positive electrode collector includes a terminal extending out of the supporting body.

6. The rechargeable battery module of claim 3, wherein each of the plurality of unit cells has a quadrangular or hexagonal cross-sectional structure.

7. A rechargeable battery module comprising:
a plurality of coin batteries, wherein each of the plurality of coin batteries includes a negative electrode, a positive electrode, and a solid electrolyte positioned between the negative electrode and the positive electrode; a negative electrode lower case that forms the negative electrode and in which a negative electrode current collector is accommodated; a negative electrode upper case that is combined with the negative electrode lower case and in which the solid electrolyte is bonded to a front opening of the negative electrode upper case; and
a battery pack on which the plurality of coin batteries are mounted and that electrically connects the plurality of coin batteries to each other,
wherein the positive electrode of each of the plurality of coin batteries includes an ion-containing solution containing at least one selected from a group consisting of sodium, lithium, magnesium, and a combination of sodium, lithium and magnesium and a positive electrode current collector impregnated with the ion-containing solution, and the ion-containing solution flows into the positive electrode of each of the plurality of coin batteries from an outside of the battery pack,
wherein
the battery pack includes: a main body in which a plurality of holes in each of which each of the plurality of coin batteries is accommodated are arranged; covers that are mounted on opposite surfaces of the main body to cover the plurality of coin batteries and each of which has a slit through which the ion-containing solution flows into the positive electrode of each of the plurality of coin batteries; a collector that is installed between each of the covers and the plurality of coin batteries to electrically connect the plurality of coin batteries; and a sealing portion that is installed at the main body to seal between the positive electrode and the negative electrode of each of the plurality of coin batteries.

8. The rechargeable battery module of claim 7, wherein the sealing portion includes a sealing member installed between each of the plurality of holes and the plurality of coin batteries, and an O-ring that is disposed along a circumference of the plurality of holes to seal the covers and the main body.

9. The rechargeable battery module of claim 7, wherein the sealing member is formed to have a tubular structure surrounding an outer circumferential surface of each of the plurality of coin batteries, and is pressed between the covers and the main body to be in close contact between the plurality of holes and the plurality of coin batteries.

10. The rechargeable battery module of claim 7, wherein the collector is formed to have a ring shape, and a pressing bar that presses the positive electrode of each of the plurality of coin batteries so that the collector closely contacts the solid electrolyte is formed by extending from the collector to pass a center of the ring.

11. The rechargeable battery module of claim 10, wherein the collector includes a terminal extending out of the battery pack.

12. The rechargeable battery module of claim 7, wherein a stepped groove in which the collector is seated is formed in a front surface of the covers toward the main body.

13. The rechargeable battery module of claim 7, wherein the main body is provided with a stepped portion having a size matching with an outer diameter of the negative electrode upper case of each of the plurality of coin batteries, the stepped portion is formed inside the plurality of holes, and the negative electrode upper case of each of the plurality of coin batteries is caught and fixed to the stepped portion.

14. The rechargeable battery module of claim 7, wherein each of the plurality of coin batteries has a quadrangular or hexagonal cross-sectional structure.

15. The rechargeable battery module of claim 7, wherein the plurality of coin batteries are arranged in that the negative electrode of each of the plurality of coin batteries and the positive electrode of each of the plurality of coin batteries are alternately disposed and the collector connects the negative electrode and the positive electrode which are adjacent to each other, so that the plurality of coin batteries are connected in series.

16. The rechargeable battery module of claim 7, wherein the plurality of coin batteries are arranged in that the negative electrodes of all the plurality of coin batteries are disposed on a first surface of the main body and the positive electrodes of all the plurality of coin batteries are disposed on a second surface of the main body opposite to the first surface, and the collector connects the negative electrode of the plurality of coin batteries adjacent each other and the positive electrode of the plurality of coin batteries adjacent each other, so that the plurality of coin batteries are connected in parallel.

17. The rechargeable battery module of claim 1, further comprising
a housing in which a plurality of guides are arranged,
wherein the battery pack is included in the housing in plurality and each of the plurality of the battery packs included in the housing is inserted and accommodated in each of the guides, and
wherein the plurality of the battery packs included in the housing are electrically connected to each other.

18. The rechargeable battery module of claim 17, wherein the housing is included in the rechargeable battery module in plurality and the plurality of the housings included in the rechargeable battery module are connected to each other.

19. A manufacturing method of a rechargeable battery module, comprising:
preparing a battery pack including a supporting body in which a plurality of grooves are provided and a negative electrode collector is integrally formed within the supporting body;
positioning a plurality of negative electrodes on each of the plurality of grooves, positioning a plurality of solid electrolytes on the plurality of negative electrodes such that each of the plurality of the solid electrolytes is bonded to each of the plurality of grooves, and then positioning a plurality of positive electrodes on the solid electrolytes such that a plurality of unit cells each of which has the negative electrode, the solid electrolyte, and the positive electrode are mounted on the battery pack;
installing a positive electrode collector on the supporting body such that all the plurality of positive electrodes of the plurality of unit cells are electrically connected to each other; and
flowing an ion-containing solution containing at least one selected from a group consisting of sodium, lithium, magnesium, and a combination thereof into the plurality of positive electrodes of the plurality of unit cells from an outside of the battery pack.

20. A manufacturing method of a rechargeable battery module, comprising:
preparing a battery pack including a main body in which a plurality of holes are formed and a cover provided with a collector;
preparing a plurality of coin batteries each including a negative electrode, a positive electrode, and a solid electrolyte positioned between the negative electrode and the positive electrode, a negative electrode lower case that forms the negative electrode and in which a negative electrode current collector is accommodated, and a negative electrode upper case that is combined with the negative electrode lower case and in which the solid electrolyte is bonded to a front opening provided in the negative electrode upper case;
mounting each of the plurality of coin batteries on each of the plurality of holes with a sealing member therebetween;
installing an O-ring between the cover and the main body, and then installing the cover on the main body to electrically connect the collector to the plurality of coin batteries; and
flowing an ion-containing solution containing at least one selected from a group consisting of sodium, lithium, magnesium, and a combination thereof into the positive electrode of each of the plurality of coin batteries from an outside of the battery pack.

* * * * *